United States Patent [19]

Gunda et al.

[11] Patent Number: 4,625,622
[45] Date of Patent: Dec. 2, 1986

[54] POWER TRANSMISSION

[75] Inventors: Rajamouli Gunda, Rochester; Melvin A. Rode, West Bloomfield, both of Mich.

[73] Assignee: Vickers, Incorporated, Troy, Mich.

[21] Appl. No.: 765,796

[22] Filed: Aug. 15, 1985

[51] Int. Cl.⁴ ............................................. F15B 21/02
[52] U.S. Cl. .......................................... 91/36; 91/361; 91/459
[58] Field of Search ...................... 91/361, 362, 363 R, 91/35, 36, 459

[56] References Cited

U.S. PATENT DOCUMENTS

| | | | |
|---|---|---|---|
| 3,421,318 | 1/1969 | Falk | 91/361 X |
| 4,037,519 | 7/1977 | Miller et al. | 91/361 X |
| 4,106,390 | 8/1978 | Kodaira et al. | 91/361 X |
| 4,416,187 | 11/1983 | Nystrom | 91/361 X |
| 4,539,967 | 9/1985 | Nakajima et al. | 91/361 X |

*Primary Examiner*—Edward K. Look
*Attorney, Agent, or Firm*—Barnes, Kisselle, Raisch, Choate, Whittemore & Hulbert

[57] ABSTRACT

A system and method for pulse-width modulation of multiple solenoid-operated valves in an electrohydraulic servo system employing a microprocessor-based digital controller. Solenoid-energization pulse widths are identified by comparison of operator command input signals to feedback signals responsive to actual motion at the actuators and loads. During each modulation period, all solenoids are initially selectively simultaneously energized as a function of binary information stored in an energization control register, and the shortest energization pulse duration is identified. After a delay corresponding to such shortest duration, during which the microprocessor may perform other control functions, the solenoids associated with such shortest duration are selectively de-energized as a function of binary information stored in a de-energization control register. The next-shortest duration is then identified, and the process again delays for a time equal to the difference between such next-shortest duration and the previous duration. The process of identifying pulse durations of increasing length and correspondingly deenergizing the solenoids continues until all pulse durations have been accommodated or until the modulation period terminates, at which point the entire control process rebegins.

3 Claims, 2 Drawing Figures

POWER TRANSMISSION

The present invention is directed to valve control systems, and more particularly to a system and method for pulse-width modulation of multiple solenoid valves employing a single timer.

BACKGROUND AND OBJECTS OF THE INVENTION

Fluid valve systems, such as electrohydraulic valve systems, for vehicles and other like applications often embody multiple solenoid-operated hydraulic valves which require separate independent control to obtain motion at the load desired by the operator. One example of such a system would be control of the bucket arm of an excavator, involving provision of a solenoid valve and actuator for each of the horizontal and vertical degrees of freedom. It is conventional practice, even where control is implemented by a microprocessor-based control package, to employ separate timers to pulse width modulate each solenoid valve, wasting computing power that could be used for other purposes.

It is a general object of the present invention to provide a fluid valve control system and method for pulse-width modulation of multiple solenoid valves employing a single timer, and specifically a single microprocessor-based timer subroutine.

SUMMARY OF THE INVENTION

In implementation of the present invention, pulse-width modulation of each of several solenoid valves necessary to obtain motion desired by the operator is first determined in the usual manner. Preferably, operator input command signals indicative of desired motions are compared with feedback signals from each actuator and load to obtain corresponding error signals, which are then translated into a pulse-width ratio of a total modulation pulse period. Each pulse-width signal is stored in a corresponding register, and is updated periodically as a function of a change in operator demand and/or motion at the actuator and load. The pulse-width signals are employed to pulse-width modulate a periodic signal to each actuator solenoid to obtain desired motion.

In accordance with the present invention, a pulse-width modulation period common to all of the solenoid actuators is established and repeated continuously. Separate control registers are likewise established to control energization and de-energization of the various solenoids, with separate bits of each register indicating whether the associated solenoid is to be energized or de-energized. At the onset of each modulation period, all solenoids are selectively energized as a function of binary information in the energization control register. The various pulse-width registers are polled in sequence to identify the shortest pulse duration, and control operation is delayed for a time corresponding to this duration, during which the microprocessor may perform other computation functions.

At the end of the shortest pulse duration time, the corresponding solenoid is selectively de-energized as a function of associated binary information in the deenergization control register. The next-shortest pulse duration is then identified by polling the pulse-width registers, and a difference is obtained between such next-shortest pulse duration and the previous pulse duration. Again, further control operation is delayed for the time of this pulse duration difference, during which the microprocessor may perform other control functions. At the end of the difference duration time, the solenoid valve associated with such next-shortest pulse duration is selectively de-energized, again as a function of binary information in the de-energization control register. The next-shortest pulse duration is then identified and the entire process repeated until all pulse durations in the pulse width registers have been implemented, or until the modulation period terminates, at which point the entire control process rebegins.

Thus, the control microprocessor is freed for other control functions during each of the delay intervals. The entire pulse-width modulation process for all solenoids may be readily performed in a single subroutine which essentially identifies and implements pulse-width control of each solenoid in order of increasing pulse duration during each modulation period. Use of separate energization and deenergization control registers storing binary information associated with the various valve solenoids additionally facilitates computation speed.

BRIEF DESCRIPTION OF THE DRAWINGS

The invention, together with additional objects, features and advantages thereof, will be best understood from the following description, the appended claims and the accompanying drawings in which:

DETAILED DESCRIPTION

Figure 1:
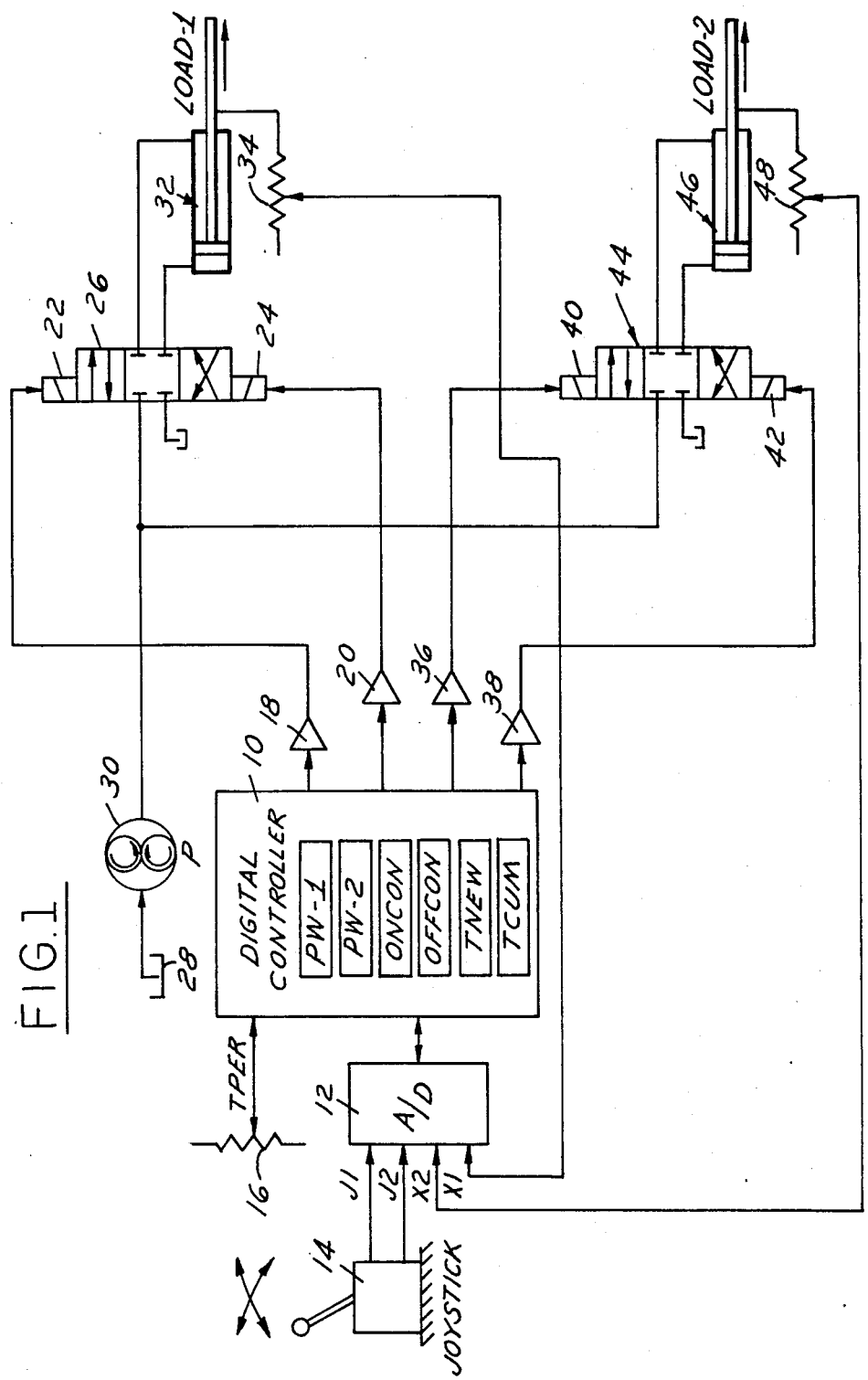
FIG. 1 is a schematic diagram of an electrohydraulic control system for implementing the present invention.

Referring to FIG. 1, a microprocessor-based digital controller 10 is connected by an a/d converter 12 to receive a pair of input command signals J1,J2 from an operator joystick 14. Signals J1,J2 may indicate, for example, motion desired by the operator at a load in two controllable directions or degrees of freedom. Controller 10 likewise receives and periodically samples a signal TPER indicating desired modulation period from an operator variable resistor 16 of other suitable input means. (For a given application, TPER may be constant and fixed by programming without external input.) Controller 10 provides digital on/off outputs through the amplifiers 18,20 to the solenoids 22,24 of a valve 26 which selectively feeds hydraulic fluid under pressure from a source 28 and a pump 30 to drive a cylinder 32. The piston of cylinder 32 is coupled to the load (not shown). A position sensor such as a variable resistor 34 provides a signal indicative of actual motion at the actuator and load to an input of a/d converter 12 for sampling and comparison with the corresponding command signal from joystick 14.

Controller 10 likewise provides digital or on/off signals through amplifiers 36,38 to the solenoids 40,42 of a valve 44 for selectively connecting source 28 and pump 30 to the cylinder 46 for actuating a second load (not shown). A sensor 48 feeds a corresponding signal indicative of motion at the second actuator and load to an input of a/d converter 12. In general, controller 10 samples and compares each sensor signal X1,X2 to the corresponding sampled command signal J1,J2, and determines the necessary pulse-width modulation of energization signals to valve solenoids 22,24 and 40,42 to obtain motion at the actuators and loads desired by the operator. Techniques for deriving this information are well-known in the art and need not be described further in this application.

In accordance with the present invention, a number of registers are established within controller 10, and controller 10 is suitably programmed to utilize the information contained therein in order to obtain necessary pulse-width modulation from a single timer and control routine. The registers are illustrated schematically in FIG. 1 and include, in the exemplary embodiment, a register PW1 for storing information indicative of pulse width to solenoid valve 26, a register PW2 for storing pulse width to valve 44, an ONCON register for storing binary information indicative of whether the various valve solenoids are to be energized in each modulation period, and an OFFCON register containing binary information indicative of whether the various solenoids are to be de-energized during a modulation period. Information stored in the PW1, PW2 ONCON and OFFCON registers is continuously and periodically updated in the usual manner as a function of desired and actual motion at the various actuators and loads. A pair of registers TNEW and TCUM are likewise established within controller 10 for storing variable information employed during the control subroutine.

Figure 2:
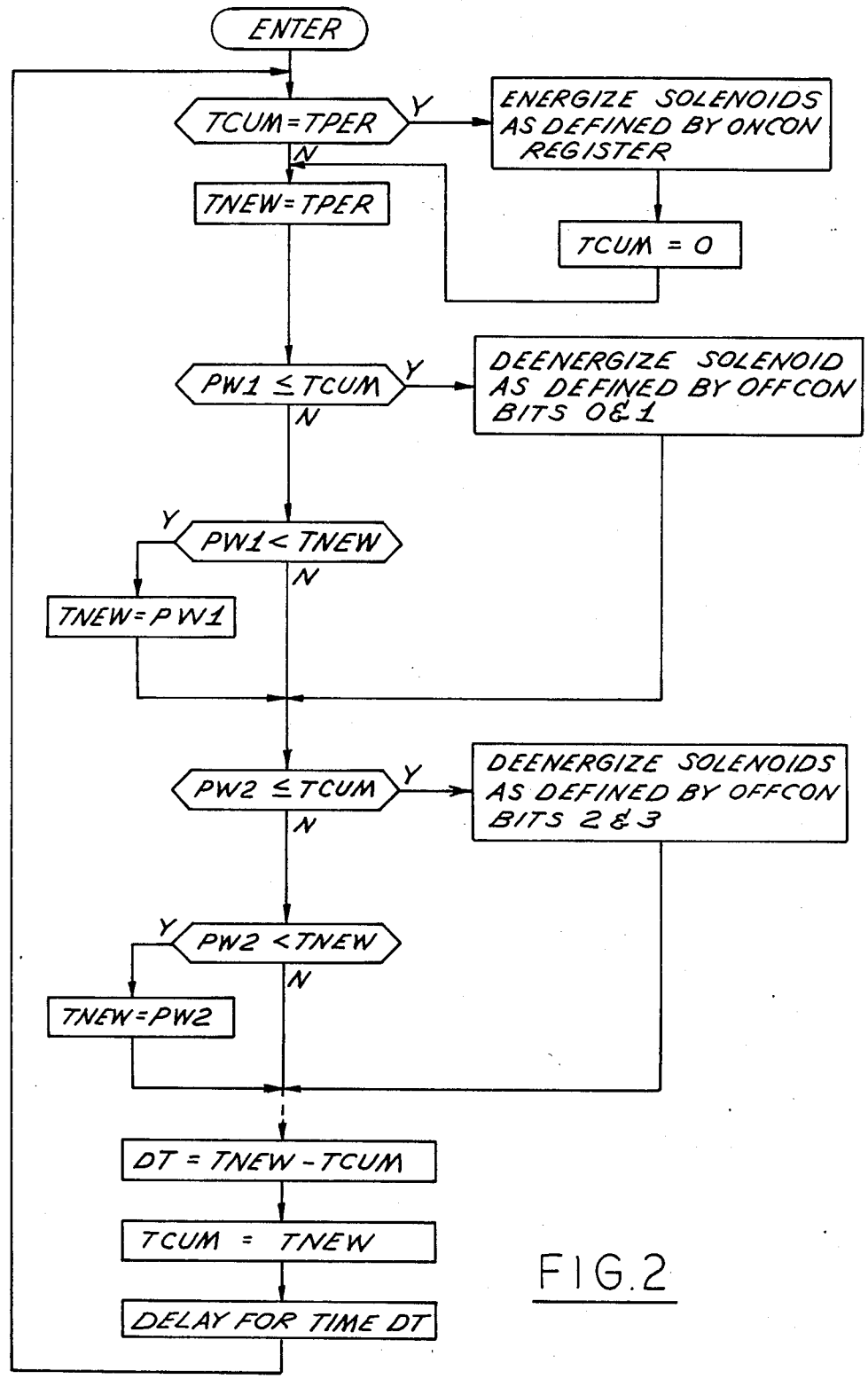
FIG. 2 is a flow chart illustrating operation of the solenoid pulse-width modulation subroutine in accordance with a presently preferred embodiment of the invention.

FIG. 2 is a flow chart illustrating a presently preferred embodiment of such control subroutine. For purposes of explaining operation, it will be assumed that the ONCON register is a four-bit register containing the digital byte or word 0111, and that the OFFCON register contains the digital word 0010. A one-bit in the ONCON register indicates that a corresponding solenoid is to be energized during a modulation period. Thus, assigning the bits of the ONCON register to solenoids 22,24,40,42 in increasing order of significance, 0111 in the ONCON register indicates that solenoids 22,24 and 40, but not solenoid 42, are to be energized during each modulation period. Likewise, a one-bit in the OFFCON register indicates that the corresponding solenoid is to remain energized—i.e. not to be de-energized—during each modulation period. Thus, a 0010 in the OFFCON register indicates that solenoids 22,40 are to be de-energized during each modulation period, but that solenoids 24 is not to be de-energized. In the example under discussion, solenoid 42 is not energized and remains off during the modulation periods. It will also be assumed that PW1 is less than PW2, and that both PW1 and PW2 are greater than zero and equal to or less than TPER.

Referring to FIG. 2, initially, the variable TCUM is first tested by comparison with the preselected modulation period TPER, which may be on the order of ten milliseconds, for example. At the initiation of a modulation period, this comparison is true, and all solenoids 22,24,40 and 42 are energized as defined by corresponding bits of the ONCON register. Thus, in the example under discussion, solenoids 22,24 and 40 are energized by application thereto of corresponding signals through amplifiers 18,20 and 36, while solenoid 42 remains de-energized. The variable TCUM is set equal to zero, and the variable TNEW is set equal to TPER. PW1 is then compared with TCUM, which has been set to zero, so that the comparison is false. PW1 is then compared with TNEW, which has been set equal to TPER, so that the comparison is true and TNEW is reset equal to PW1. PW2 is then compared with TCUM, which is still equal to zero, so that the comparison is false. PW2 is compared with TNEW, which has been set equal to PW1. Since it has been assumed that PW1 is less than PW2, such comparison of PW2 with TNEW will be false. A delay time DT is then established as equal to the difference between TNEW and TCUM. Since TNEW is equal to PW1 and TCUM is equal to zero, DT will be set equal to PW1. Thus, during the first pass of the routine illustrated in FIG. 2, the various solenoids have been selectively activated as defined by the ONCON register, the shortest pulse width PW1 has been identified, and the variable delay time DT has been set equal thereto. TCUM is then set equal to TNEW, and the process is delayed for time DT, equal at this time to PW1, during which the microprocessor may perform other control functions.

After a delay of time DT, the process recycles and TCUM, now equal to TNEW and PW1, is compared with TPER. This comparison is false and TNEW is again set equal to TPER. On this pass, when PW1 is compared with TCUM, such comparison is true, so that operation branches to de-energize solenoids 22,24 as defined by bits zero and one of the OFFCON register. In the example under discussion, solenoid 22 is thus turned off, while solenoid 24 remains energized. PW2 is then compared with TCUM, which is still equal to PW1, so that the comparison is false. PW2 is then compared with TNEW, which is now equal to TPER, so that the comparison provides true. TNEW is then set equal to PW2 and a second delay time DT is identified as being equal to the difference between TNEW, now equal to PW2, and TCUM, still equal to PW1. Thus, upon second pass through the control cycle, delay time DT is identified as the difference between the shortest pulse duration PW1 and the next-shortest pulse duration PW2. The variable TCUM is set equal to TNEW, and thus equal to PW2, and the control process delays for the time DT. On the third pass through the control cycle, TCUM is equal to PW2, so that the comparison of PW1 with TCUM is true, as is the comparison of PW2 with TCUM. Thus, solenoids 40,42 are deenergized as defined by OFFCON bits two and three and, for the four-solenoid example, the process is complete.

It will be appreciated that the principles of the invention, including particularly the process of FIG. 2, may be increased by adding additional PW/TCUM comparison, and corresponding solenoid de-energization functions, into the flow chart immediately above the step at which delay time DT is established. Likewise, in an eight-bit microprocessor, each of the ONCON and OFFCON registers may accommodate binary information relating to eight solenoids. In a sixteen-bit microprocessor, information relating to sixteen solenoids may be stored in the ONCON and OFFCON registers. Although the invention has been disclosed in detail with specific reference to electro-hydraulic valves, the principles thereof may be applied equally as well to control of other fluid valve systems, such as electropneumatic valves.

The invention claimed is:

1. A fluid servo system comprising first and second solenoid valve actuators for variably actuating respective first and second loads, first and second sensing means respectively coupled to said actuators and loads to provide corresponding first and second sensor signals respectively indicative of actuation at said actuators and loads, means for receiving first and second input command signals, and digital control means for providing first and second pulse-width modulated signals to said first and second solenoid valve actuators as respective functions of differences between said first and second sensor signals and the corresponding said first and second command signals, said digital control means comprising means for determining a continuously repeating modulation time period TPER common to both of said actuators, first and second register means for respectively storing modulation time durations PW1 and PW2 equal to or less than said modulation period TPER for said first and second actuators respectively, means for selectively energizing said first and second solenoid actuators at the onset of each said time period TPER, means for determining the lesser of said time durations PW1 and PW2, means for selectively de-energizing one of said solenoid actuators associated with the lesser of said time durations PW1 and PW2 following termination of said lesser duration, means for determining a difference between said time durations PW1 and PW2, and means for selectively de-energizing the other of said solenoid actuators following termination of said difference between said durations.

2. The system set forth in claim 1 wherein said means for selectively energizing and de-energizing said solenoids comprise third and fourth registers respectively storing information indicative of energization and de-energization modes at said solenoid actuators, energization and de-energization commands at each solenoid of said actuators being represented by corresponding bits in said registers.

3. In an electrohydraulic servo system which includes a plurality of hydraulic actuators coupled to associated valves, said valves being operated by a plurality of electrical solenoid meeans, and means for directing pulse-width modulated control signals to each of said solenoid means for controlling operation of the associated said valves and actuators, a method of pulse-width modulating all of said solenoid means employing a single timer comprising the steps of:

(a) establishing a repeating pulse-width modulation period common to all of said solenoid means, (b) separately storing energization pulse durations within said period for each of said solenoid means, (c) selectively energizing all of said solenoid means at the onset of each said period, (d) identifying the shortest said pulse duration and delaying for a time equal to said shortest duration, (e) selectively de-energizing the said solenoid means associated with said shortest pulse duration, (f) identifying a difference between said shortest pulse duration and the next-shortest said pulse duration, and delaying for a time equal to said difference, (g) selectively de-energizing the said solenoid means associated with said next-shortest pulse duration, and (h) repeating said steps (f) and (g) using successively increasing pulse durations until said period is terminated.

* * * * *

UNITED STATES PATENT AND TRADEMARK OFFICE
CERTIFICATE OF CORRECTION

PATENT NO. : 4,625,622

DATED : December 2, 1986

INVENTOR(S) : Rajamouli Gunda and Melvin A. Rode

It is certified that error appears in the above-identified patent and that said Letters Patent are hereby corrected as shown below:

Column 4, line 29, "provides" should be --proves--

Signed and Sealed this

Twenty-first Day of April, 1987

Attest:

DONALD J. QUIGG

Attesting Officer

Commissioner of Patents and Trademarks